July 14, 1959         R. D. RANDEL         2,894,762
REMOVABLE AXLE PROTECTING UNIT FOR CYCLES
Filed Sept. 17, 1957
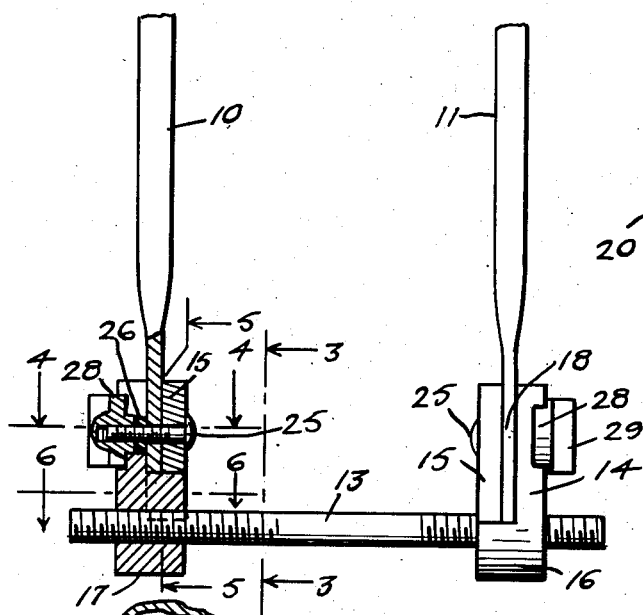
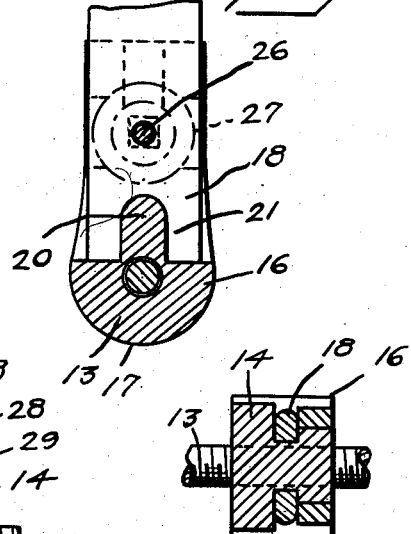
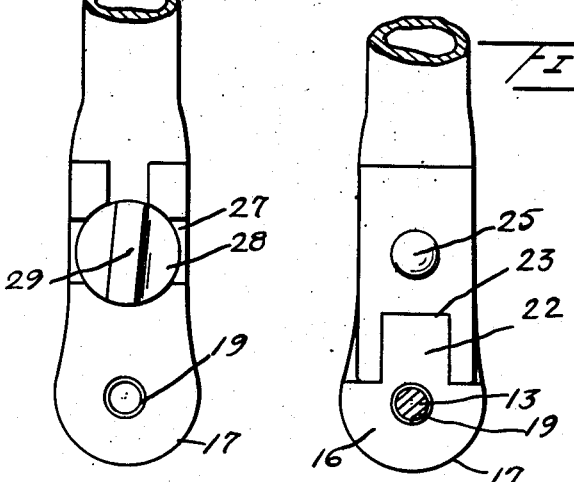
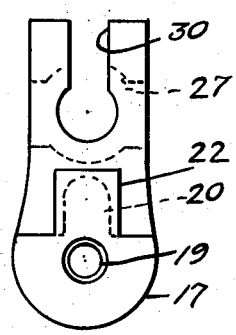
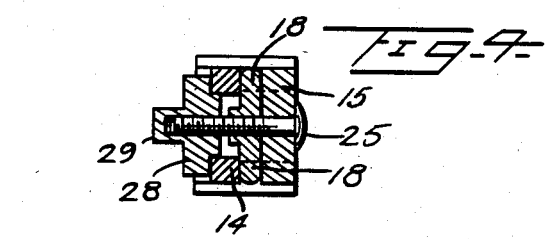
R.D. Randel
INVENTOR
BY *CA Snow & Co.*
ATTORNEYS.

United States Patent Office 2,894,762
Patented July 14, 1959

2,894,762
REMOVABLE AXLE PROTECTING UNIT FOR CYCLES

Raymond D. Randel, Frankfort, Kans.

Application September 17, 1957, Serial No. 684,581

1 Claim. (Cl. 280—281)

This invention relates to an axle saver, and has particular applicability to bicycles, motorcycles, tricycles and other vehicles employing a forked type wheel mounting.

A primary object of this invention is the provision of an improved device by means of which the wheel and axle of such a vehicle may be removed, for purposes of tire replacement, or the like, without damage to the axle per se.

A further object of the invention is the provision of such a device which is secured, as by threading, directly to the axle of the, illustratively, bicycle and which may be removed from the fork as a unit together with the wheel, and which will further present no impediment to replacement of the tire or the like.

Still another object of the invention is the provision of such a device, which, by virtue of its ready removal from the axle fork will preclude the moving of the axle from side to side, occasioned by worn threads, which threads are worn by the normal bicycles fork resting thereon.

A further object of this invention is therefore the provision of such a device which will preclude the maladjustment of bearings, and reduce excessive wear on the bearings and bearing races.

Still further objects reside in the combination of elements, arrangements of parts, and features of construction, all as will be more fully pointed out hereinafter and shown in the accompanying drawings wherein there is disclosed a preferred embodiment of this inventive concept.

Still other objects will in part be obvious, and in part be pointed out hereinafter as the description of the invention proceeds, and shown in the drawing.

In the drawing:

Figure 1 is a fragmentary front view, partially in elevation, and partially in section, disclosing the axle saver of the instant invention as applied to the fork of a bicycle wheel.

Figure 2 is a side elevational view of portions of the structure of Figure 1 as viewed from the right.

Figure 3 is a side elevational view of the right hand fork of Figure 1 as viewed from the left, or a section taken substantially along the line 3—3 of Figure 1, as viewed in the direction indicated by the arrows.

Figure 4 is a sectional view taken substantially along the line 4—4 of Figure 1 as viewed in the direction indicated by the arrows.

Figure 5 is a sectional view taken substantially along the line 5—5 of Figure 1 as viewed in the direction indicated by the arrows.

Figure 6 is an enlarged sectional view taken substantially along the line 6—6 of Figure 1 as viewed in the direction indicated by the arrows.

Figure 7 is a side elevational view of one of the elements of the device in disassembled position.

Similar reference characters refer to similar parts throughout the several views of the drawing.

Having reference now to the drawing in detail, and more particularly to Figure 1, there are disclosed at 10 and 11 respectively the conventional arms of the fork of, illustratively a bicycle. In conventional practice these arms extend downwardly on opposite sides of the front wheel of the bicycle, to the hub of the wheel, and have secured to the ends thereof a suitable axle 13. A primary purpose of the instant invention is to provide an attachment, which will serve to carry the axle 13, without the weight of the fork resting directly thereon, and which will permit ready removal of the entire assembly, without the necessity of injuring the threads on the axle 13, by removing the conventional taps from the ends thereof.

The device of the instant invention comprises two oppositely disposed identical units, each of which comprises an outer plate 14, and an inner plate 15. The outer plate 14 includes a right angularly disposed extension 16, which is preferably provided with an arcuate lower surface 17, which extends beneath the lower portion 18 of either of forks 10 or 11. This portion 17 has a threaded aperture 19 extended therethrough, which is adapted to be engaged by the threaded axle 13, it being understood that complementary parts exist on the opposite fork arms 10 and 11.

The extension 16 has an upwardly extending arcuate portion 20, which is adapted to seat between the normal bifurcations 21 of the lower end 18 of either of fork arms 10 or 11, and positioned outwardly therefrom an upstanding rectangular portion 22, which is adapted to be engaged by a cutaway recess 23 in inner plate 15. A screw 25 is adapted to extend through suitable aligned bores or apertures in inner plate 15, and fork leg 10 or 11, and be secured in position as by means of a nut 26, thus rendering plate 15 and fork 26, in effect an integral unit.

The outer face of each outside plate 14 is recessed as at 27, for the accommodation of a nut 28 adapted for engagement with the screw 25. The nut 28 is of considerable size, and provided with a protruding extension or finger hole 29, by means of which the same may be readily rotated manually, or, if necessary by means of a suitable tool. The upper portion of the plate 14 has a vertical slot 30 extended therethrough, which is of a dimension, upon removal of the nut 28 to permit the bolt or screw 25 to pass upwardly therethrough, whereby upon removal of both nuts 28 the entire wheel assembly including both outer plates 14, and their associated axle 13, as well as the wheel carried thereby may be readily removed with a minimum of effort and difficulty, thus materially simplifying the effort necessary to change the tire of a bicycle or the like, and further resulting, as previously described in a maximum saving of wear and tear on the axle per se, either by pressure of the fork thereagainst, or by the necessity of threading and unthreading lugs or bolts onto the ends of the axle each time the wheel is removed.

From the foregoing it will now be seen that there is herein provided an improved device which accomplishes all of the objects of this invention, and others, including many advantages of great practical utility and commercial importance.

As many embodiments may be made of this inventive concept, and as many modifications may be made in the embodiment herein before shown and described, it is to be understood that all matter herein is to be interpreted merely as illustrative and not in a limiting sense.

What I claim is:

In an attachment for the forks of bicycles or similar vehicles, the combination of an inner plate and an outer plate on opposite sides of each leg of the fork, said outer plate including a right angularly disposed extension adapted to extend beneath the fork leg, an upwardly extended arcuate portion on said extension adapted to seat between the bifurcations on the leg of the fork, and an outwardly extending upstanding rectangular portion, said inner plate having a recess therein for the accommodation of said outwardly extending upstanding portion on said extension, means for removably securing said plates to each of said fork legs and to each other, axle supporting means carried by one of said inner and outer plates, said means removably securing said plates to each other and to said fork legs and comprising a bolt and a manually removable nut, said plates carrying said axle supporting means being provided with vertical slots whereby upon release of said manually removable nut, said plates, the axle carried thereby and its associated wheel may be removed from the fork as a unit.

References Cited in the file of this patent

UNITED STATES PATENTS

| | | |
|---|---|---|
| 624,442 | Baker | May 9, 1899 |
| 2,768,834 | Wilson | Oct. 30, 1956 |

FOREIGN PATENTS

| | | |
|---|---|---|
| 1,424 | Great Britain | of 1911 |
| 25,111 | Great Britain | of 1910 |